United States Patent
Furukawa

(10) Patent No.: US 10,742,840 B2
(45) Date of Patent: Aug. 11, 2020

(54) COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD EXECUTED BY COMMUNICATION DEVICE

(71) Applicant: BROTHER KOGYO KABUSHIKI KAISHA, Nagoya-shi, Aichi (JP)

(72) Inventor: Akihiro Furukawa, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 0 days.

(21) Appl. No.: 16/360,107

(22) Filed: Mar. 21, 2019

(65) Prior Publication Data
US 2019/0306372 A1    Oct. 3, 2019

(30) Foreign Application Priority Data

Mar. 29, 2018    (JP) ................. 2018-065836

(51) Int. Cl.
| H04N 1/00 | (2006.01) |
| H04N 1/44 | (2006.01) |
| H04L 29/12 | (2006.01) |

(52) U.S. Cl.
CPC ....... H04N 1/4413 (2013.01); H04L 61/2514 (2013.01); H04N 1/00315 (2013.01); H04N 2201/0094 (2013.01)

(58) Field of Classification Search
CPC ......... H04N 2201/0094; H04N 1/4413; H04N 1/00315; H04L 61/2514
USPC ....................................... 358/1.15
See application file for complete search history.

(56) References Cited

U.S. PATENT DOCUMENTS

| 2010/0235883 | A1 | 9/2010 | Sato |
| 2015/0213258 | A1 | 7/2015 | Masui |
| 2016/0179443 | A1 | 6/2016 | Saito |
| 2016/0337393 | A1 | 11/2016 | Tsuchitoi |
| 2017/0315762 | A1* | 11/2017 | Saito ................ G06F 3/1222 |

FOREIGN PATENT DOCUMENTS

| JP | 2010-219757 A | 9/2010 |
| JP | 2015-138523 A | 7/2015 |
| JP | 2016-119581 A | 6/2016 |
| JP | 2016-212832 A | 12/2016 |

\* cited by examiner

*Primary Examiner* — Saeid Ebrahimi Dehkordy
(74) *Attorney, Agent, or Firm* — Scully, Scott, Murphy & Presser, PC

(57) ABSTRACT

A communication device may: receive a request signal from an external device via a communication interface, the request signal including a first IP address of the external device as a sender address; determine whether the first IP address in the request signal is a global IP address in a case where the request signal is received from the external device; and send a response signal to the request signal to the external device in a case where it is determined that the first IP address is not the global IP address, wherein sending of the request signal is restricted in a case where it is determined that the first IP address is the global IP address.

19 Claims, 14 Drawing Sheets

Communication System 2

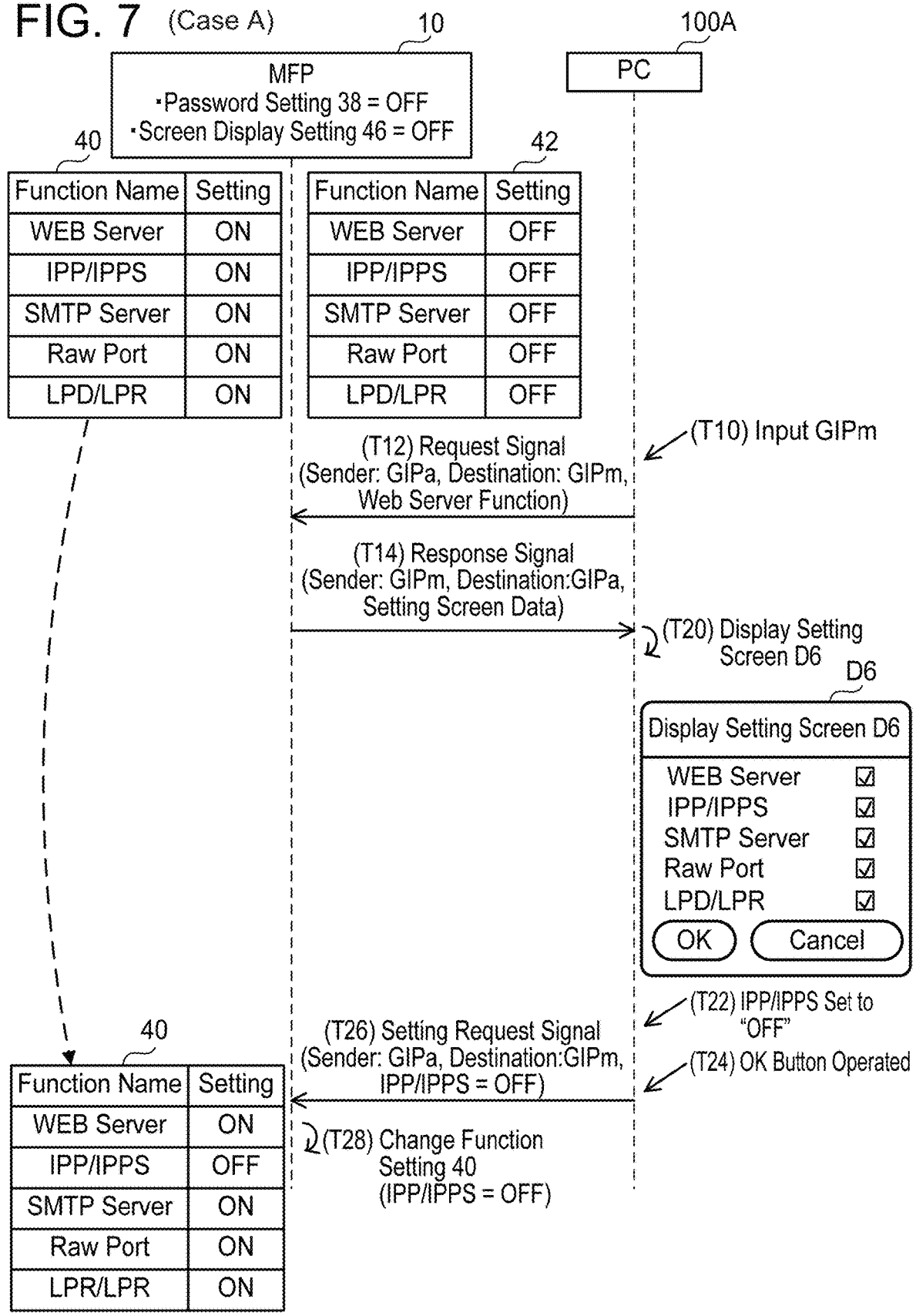

COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD EXECUTED BY COMMUNICATION DEVICE

CROSS-REFERENCE TO RELATED APPLICATION

This application claims priority to Japanese Patent Application No. 2018-065836, filed on Mar. 29, 2018, the entire contents of which are hereby incorporated by reference into the present application.

TECHNICAL FIELD

The disclosure herein discloses a communication device configured to communicate with an external device.

BACKGROUND ART

An image processing system that includes an image processing device and a plurality of communication devices has been known. When receiving a request to send system information from any of the communication devices via a network, the image processing device determines whether a type of the network is a global IP network or a private IP network. In a case of determining that the type of the network is a private IP network, the image processing device sends the system information to the communication device. On the other hand, in a case of determining that the communication device is connected to the global IP network, the image processing device determines whether the request above has been sent from a proxy server. The image processing device sends the system information to the communication device in a case of determining that the request above has been sent from the proxy server, and does not send the system information to the communication device in a case of determining that the request above has not been sent from the proxy server.

SUMMARY

The disclosure herein provides a new communication device configured to switch between executing and restricting sending of a response signal to a request signal.

A communication device disclosed in the disclosure herein may comprise a communication interface; a processor; and a memory storing computer-readable instructions therein, the computer-readable instructions, when executed by the processor, causing the communication device to: receive a request signal from an external device via the communication interface, the request signal including a first IP address of the external device as a sender address; determine whether the first IP address in the request signal is a global IP address in a case where the request signal is received from the external device; and send a response signal to the request signal to the external device in a case where it is determined that the first IP address is not the global IP address, wherein sending of the request signal is restricted in a case where it is determined that the first IP address is the global IP address.

A control method for implementing the communication device above, a computer program, and a computer-readable recording medium storing the computer program have also novelty and usefulness. Moreover, a communication system that includes the communication device and the external device, which are described above, also have novelty and usefulness.

BRIEF DESCRIPTION OF THE DRAWINGS

FIG. 7 shows a sequence diagram in Case A where the MFP receives a request signal from a PC without intervention of a router.

EMBODIMENTS

Figure 1:
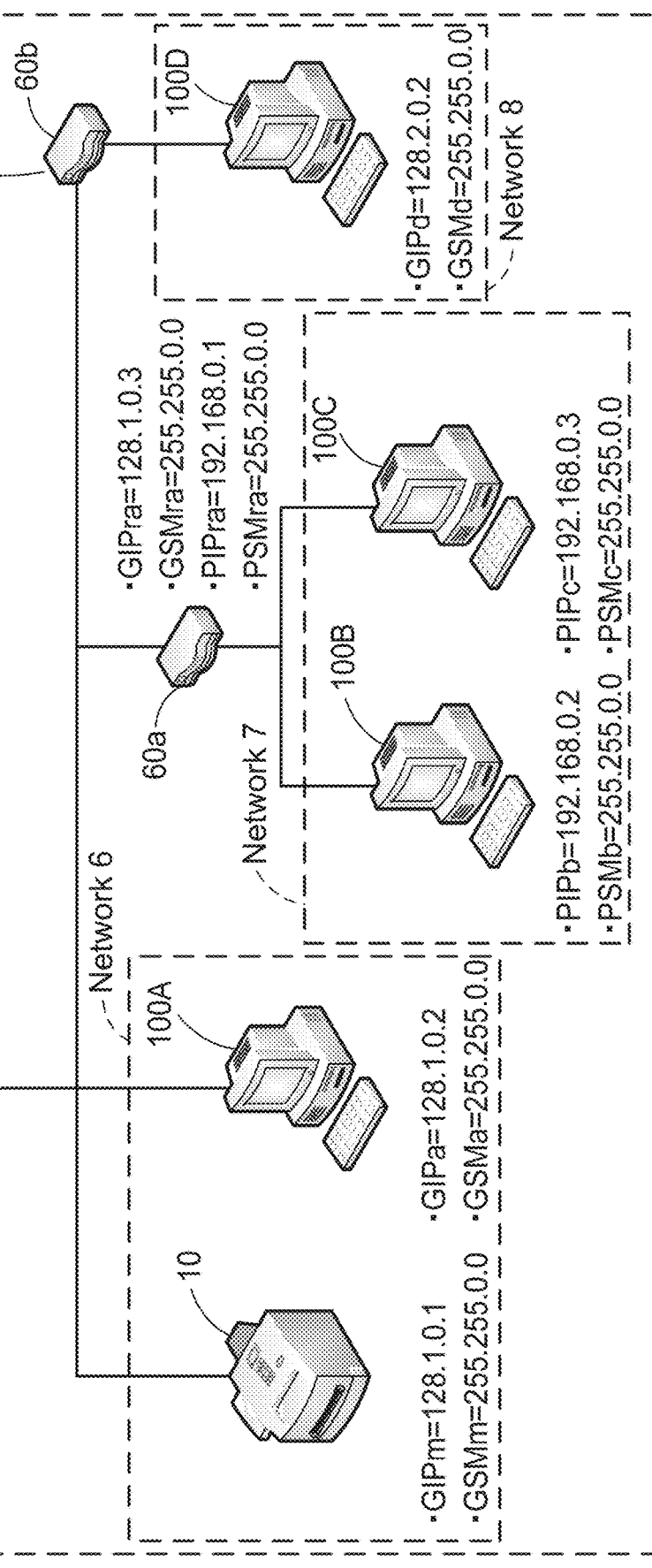
FIG. 1 shows a configuration of a communication system.
Figure 2:
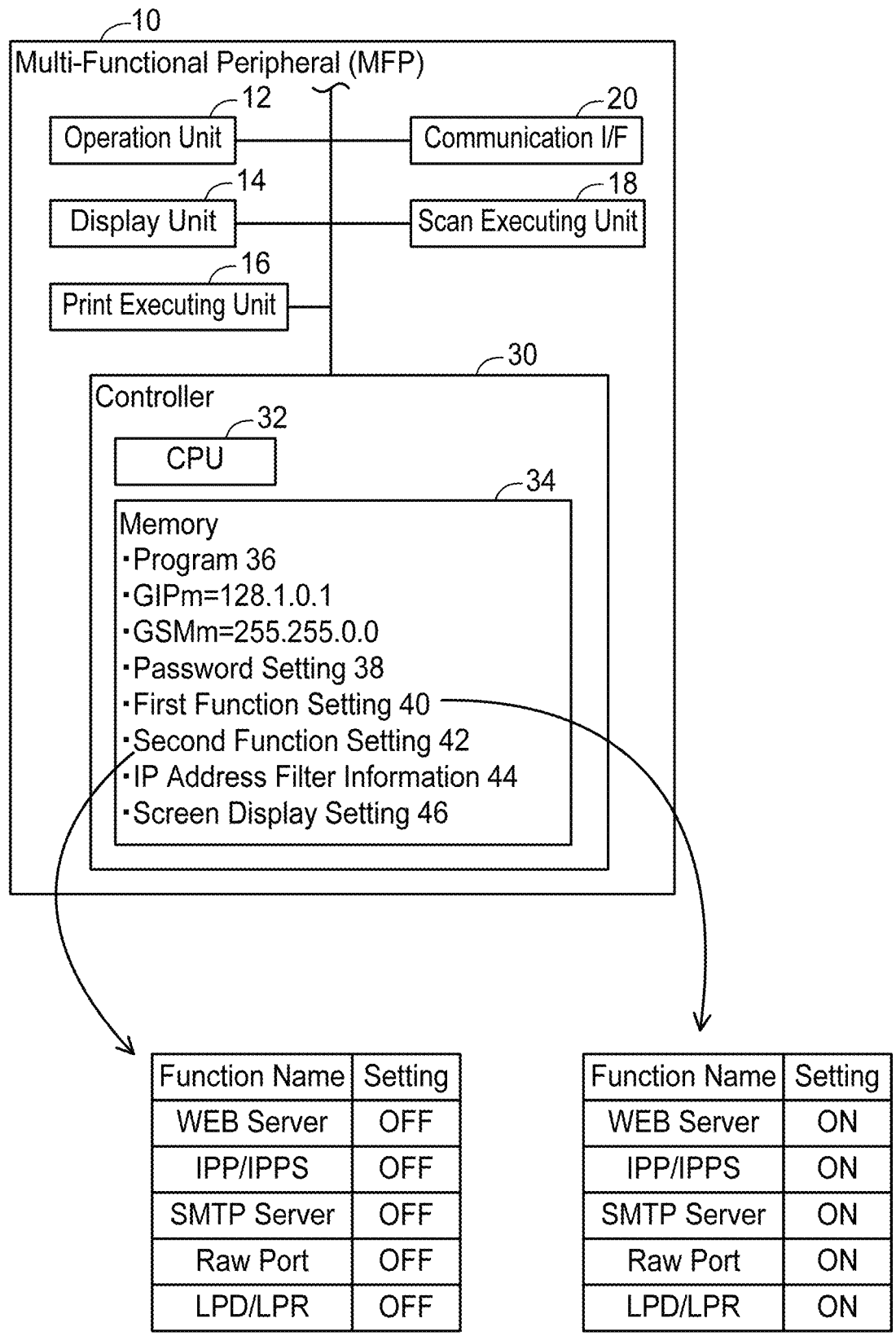
FIG. 2 shows a configuration of an MFP.

Embodiment (Configuration of Communication System 2: FIGS. 1, 2)

As shown in FIG. 1, a communication system 2 includes a multi-functional device (hereinafter called a "Multi-Functional Peripheral (MFP)") 10, multiple routers 60a, 60b, and multiple PCs 100A to 100F. The MFP 10, each of the PCs 100A to 100D, and each of the routers 60a, 60b are installed in a certain facility 80. The facility 80 is, for example, a college, a company, or the like. Each of the PCs 100E, 100F is installed in a place different from the facility 80.

The MFP 10 is assigned a global IP address "128.1.0.1" and a subnet mask "255.255.0.0". As such, the MFP 10 has its own global IP address, and hence can execute communication using the Internet 4, without intervention of any router in the facility 80. Notably, a global IP address may hereinafter be described as a "GIP", and a subnet mask for masking the global IP address may hereinafter be described as a "GSM". The GIP and the GSM of the MFP 10 may be respectively described as a "GIPm" and a "GSMm".

The PC 100A is assigned a GIP "128.1.0.2" (which may hereinafter be described as a "GIPa"), and a GSM "255.255.0.0" (which may hereinafter be described as a "GSMa"). The MFP 10 and the PC 100A have a same network address "128.1". In other words, the MFP 10 and the PC 100A can be said to belong to the same network 6 identified by the network address "128.1", and can communicate with each other by using the network 6. Each of the devices 10, 100A in the network 6 has a GIP, and has no private IP address (i.e., local IP address). Therefore, the network 6 may not be exactly called a "Local Area Network (LAN)", but can still be called a "LAN" in that it is a network for executing communication without intervention of the Internet 4. Notably, a private IP address may hereinafter be described as a "PIP", and a subnet mask for masking the private IP address may hereinafter be described as a "PSM".

Moreover, each of the MFP 10 and the PC 100A has a GIP "128.1.0.3" of the router 60a (which may hereinafter be described as a "GIPra") as a gateway address. As mentioned above, the MFP 10 and the PC 100A do not execute communication using the Internet 4 via the router 60a. The MFP 10 and the PC 100A can execute communication with another device (e.g., the PC 100B) in the facility 80, via the router 60a. Notably, the router 60a is assigned a GSM "255.255.0.0" (which may hereinafter be described as a "GSMra").

The PC 100B is assigned a PIP "192.168.0.2" (which may hereinafter be described as a "PIPb") and a PSM "255.255.0.0" (which may hereinafter be described as a "PSMb"). Moreover, the PC 100C is assigned a PIP "192.168.0.3" (which may hereinafter be described as a "PIPc") and a PSM "255.255.0.0" (which may hereinafter be described as a "PSMc"). The PC 100B and the PC 100C have the same network address "192.168". In other words, the PC 100B and the PC 100C belong to a same network 7 (i.e., a LAN 7) identified by the network address "192.168", and can communicate with each other by using the network 7.

Each of the PC 100B and the PC 100C has a PIP "192.168.0.1" of the router 60a (which may hereinafter be described as a "PIPra") as a gateway address. Therefore, each of the PCs 100B, 100C can communicate with another device (e.g., the MFP 10) in the facility 80, via the router 60a. It should be noted that the router 60a has no Network Address Translation (NAT) function, which is an IP address translation function (or alternatively, the router 60a has the function, but the function is disabled). Thus, each of the PCs 100B, 100C that has no GIP cannot execute communication using the Internet 4. Notably, the router 60a is assigned a PSM "255.255.0.0" (which may hereinafter be described as a "PSMra").

The PC 100D is assigned a GIP "128.2.0.2" (which may hereinafter be described as a "GIPd") and a GSM "255.255.0.0" (which may hereinafter be described as a "GSMd"). The PC 100D belongs to a network 8 identified by a network address "128.2". The PC 100D has its own GIPd, and hence can execute communication using the Internet 4, even without intervention of the router 60b. It should be noted in the present system that the PC 100D is connected to the router 60b. The PC 100D can therefore execute communication using the Internet 4 via the router 60b.

The PC 100D has a GIP "128.2.0.1" of the router 60b (which may hereinafter be described as a "GIPrb2") as a gateway address. The PC 100D can therefore execute communication with a device (e.g., the MFP 10) that has the network address "128.1" different from the network address "128.2", via the router 60b. To implement such communication, the router 60b has the GIPrb2 for executing communication with a device (e.g., the PC 100D) in the network 8, and additionally, a GIP "128.1.0.4" (which may hereinafter be described as a "GIPrb1") for executing communication with a device (e.g., the MFP 10) that has the network address "128.1". It should be noted that the router 60b has no NAT function. Thus, when the PC 100D communicates with the MFP 10 via the router 60b, the GIPd of the PC 100D is not translated into the GIPrb1 of the router 60b. Notably, the router 60b is assigned a GSM "255.255.0.0" (which may hereinafter be described as a "GSMrb1") for masking the GIPrb1 and a GSM "255.255.0.0" (which may hereinafter be described as a "GSMrb2") for masking the GIPrb2.

The PC 100E, which is outside the facility 80, is assigned a GIP "192.0.0.1" (which may hereinafter be described as a "GIPe") and a GSM "255.255.255.0" (which may hereinafter be described as a "GSMe"). Moreover, the PC 100F, which is outside the facility 80, is assigned a GIP "192.1.0.1" (which may hereinafter be described as a "GIPf") and a GSM "255.255.255.0" (which may hereinafter be described as a "GSMf").

(Configuration of MFP 10: FIG. 2)

As shown in FIG. 2, the MFP 10 is a peripheral device (e.g., a peripheral device of the PC 100A) configured to execute multiple functions including a print function and a scan function. The MFP 10 includes an operation unit 12, a display unit 14, a print executing unit 16, a scan executing unit 18, a communication interface (the interface will hereinafter be described as the "I/F") 20, and a controller 30.

The operation unit 12 includes a plurality of keys. A user can input various instructions into the MFP 10 by operating the operation unit 12. The display unit 14 is a display for displaying various information. The display unit 14 also functions as a so-called touch panel (i.e., an operation unit). The print executing unit 16 is a print mechanism of an ink-jet type, a laser type, or the like. The scan executing unit 18 is a scan mechanism such as a CCD or a CIS. The communication I/F 20 may be a wireless I/F or a wired I/F.

The controller 30 includes a CPU 32 and a memory 34. The CPU 32 executes various processes in accordance with a program 36 stored in the memory 34. The memory 34 is configured with a volatile memory, a non-volatile memory, or the like. The memory 34 stores the GIPm, the GSMm, a password setting 38, a first function setting 40, a second function setting 42, IP address filter information 44, and a screen display setting 46. The password setting 38 indicates either of a value "ON", which indicates that a password is set, and a value "OFF", which indicates that a password is not set.

The first function setting 40 is information indicating whether a function in accordance with a request mainly from a device related to the facility 80 is to be executed. In the first function setting 40, a name of a function that can be executed by the MFP 10 operating as a server (i.e., a function name) is associated with function setting information. The function setting information indicates either of a value "ON", which indicates that an execution of a corresponding function is allowed, and a value "OFF", which indicates that an execution of the function is prohibited. The function name includes a Web server function, an IPP/IPPS function, an SMTP server function, a Raw port function, and an LPD/LPR function. The Web server function is a function of sending, to an external device, all of the function setting information (i.e., "ON" or "OFF") corresponding to all of the function names in the first function setting 40 in a case of receiving a signal for requesting use of the Web server function from the external device, and changing the function setting information in a case of receiving a signal for requesting change of the function setting information from the external device. Moreover, the Web server function is also a function of providing, to the external device, information on the MFP 10 (e.g., a remaining amount of a consumable article, and the like). The IPP/IPPS function is a function of receiving print data from the external device by using an Internet Printing Protocol (IPP) protocol, and executing print in accordance with the print data. The SMTP server function is a function of receiving an electronic mail from the external device, and executing print in accordance with a file attached to the electronic mail. The Raw port function is a function of receiving print data from the external device by using a Port 9100, and executing print in accordance with the print data. The LPD/LPR function is a function of receiving print data from the external device by using a Line Printer daemon protocol (LPR) protocol, and executing print in accordance with the print data.

The second function setting 42 is information indicating whether a function in accordance with a request mainly from a device not related to the facility 80 is to be executed. In the second function setting 42, a function name is associated with function setting information as in the first function setting 40.

The IP address filter information 44 is information indicating an allowed IP address. The allowed IP address is an IP address for which the MFP 10 is allowed to execute a function in accordance with the function setting information in the first function setting 40.

The screen display setting 46 indicates either of a value "ON" at which display of a security warning screen D1 (see FIG. 6A) is enabled, and a value "OFF" at which display of the screen D1 is disabled.

Figure 3:
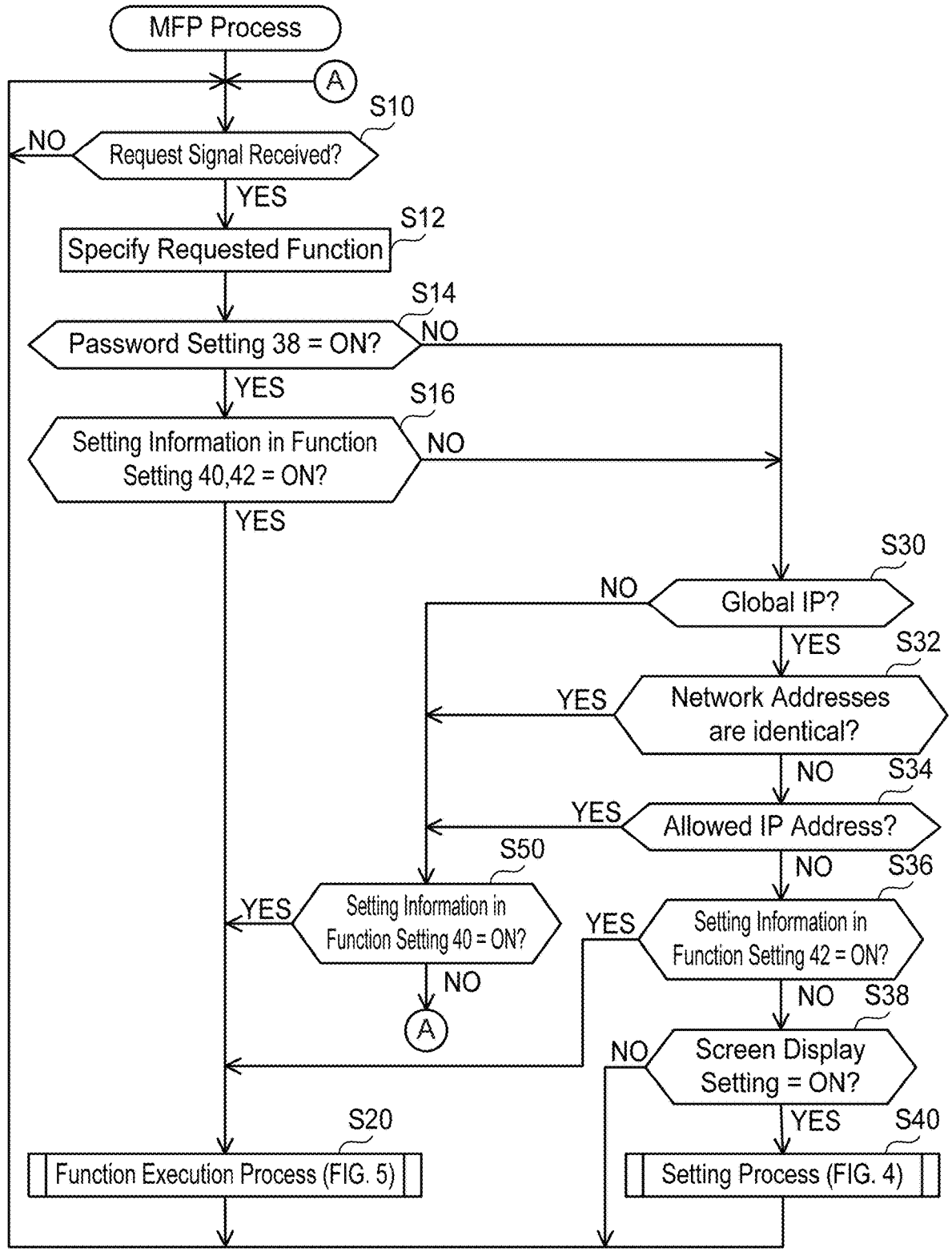
FIG. 3 shows a flowchart of processes executed by the MFP.

(Process of MFP: FIG. 3)

Next, with reference to FIG. 3, a process executed by the CPU 32 of the MFP 10 will be described. When a user turns on the MFP 10, the process in FIG. 3 is started. In the following description, the PCs 100A to 100F are collectively called a "target PC".

In S10, the CPU 32 monitors reception, from the target PC, of a request signal that includes a sender IP address, a destination IP address, and requested function information. The sender IP address is an IP address assigned to the target PC, and the destination IP address is the GIPm. The requested function information is information for requesting an execution of one of the functions which the MFP 10 is configured to execute. In a case where a function indicated by the requested function information (hereinafter described as a "requested function") is the IPP/IPPS function, the Raw port function, or the LPD/LPR function, the request signal may include print data. Moreover, in a case where the requested function is the SMTP server function, the request signal may include an electronic mail. When receiving the request signal from the target PC (YES in S10), the CPU 32 proceeds to S12.

In S12, the CPU 32 specifies the requested function based on the requested function information in the request signal received in S10.

In S14, the CPU 32 determines whether the password setting 38 is "ON". The CPU 32 proceeds to S16 in a case where the password setting 38 is "ON" (YES in S14), and proceeds to S30 in a case where the password setting 38 is "OFF" (NO in S14).

In S16, the CPU 32 determines whether the function setting information corresponding to the requested function in each of the function settings 40, 42 is "ON". In a case where the function setting information corresponding to the requested function in the first function setting 40 is "ON" and the function setting information corresponding to the requested function in the second function setting 42 is "ON", the CPU 32 makes a YES determination in S16, and proceeds to S20. On the other hand, in a case where the function setting information corresponding to the requested function in at least one of the first and second function settings 40, 42 is "OFF", the CPU 32 makes a NO determination in S16, and proceeds to S30.

In S20, the CPU 32 executes a function execution process (FIG. 5), which is a process of executing the requested function. When S20 is completed, the CPU 32 returns to S10.

In S30, the CPU 32 determines whether the sender IP address in the request signal is a global IP address (i.e., a GIP). The Japan Network Information Center (JPNIC), which is an organization that manages GIPs, classifies the GIPs into a class A to a class C. A range of GIPs in the class A is "1.0.0.0 to 9.255.255.255" and "11.0.0.0 to 126.255.255.255". A range of GIPs in the class B is "128.0.0.0 to 172.15.255.255" and "172.32.0.0 to 191.255.255.255". A range of GIPs in the class C is "192.0.0.0 to 192.167.255.255" and "192.169.0.0 to 223.255.255.255". In a case where the sender IP address is an address in the above-described ranges of the GIPs, the CPU 32 determines that the sender IP address is a GIP (YES in S30), and proceeds to S32. On the other hand, in a case where the sender IP address is not an address in the above-described ranges of the GIPs, the CPU 32 determines that the sender IP address is not a GIP (i.e., is a PIP) (NO in S30), and proceeds to S50.

In S32, the CPU 32 determines whether the network address "128.1" of the MFP 10 is identical to a specific network address. The CPU 32 initially specifies the specific network address by using the sender IP address and the GSMm ("255.255.0.0"). The CPU 32 then proceeds to S34 in a case where the network address of the MFP 10 is not identical to the specific network address (NO in S32), and proceeds to S50 in a case where the network address of the MFP 10 is identical to the specific network address (YES in S32).

In S34, the CPU 32 determines whether the sender IP address is an allowed IP address by using the sender IP address and the IP address filter information 44. In a case where the sender IP address is not identical to the allowed IP address indicated by the IP address filter information 44, the CPU 32 makes a NO determination in S34, and proceeds to S36. On the other hand, in a case where the sender IP address is identical to the allowed IP address, the CPU 32 makes a YES determination in S34, and proceeds to S50.

In S36, the CPU 32 determines whether the function setting information corresponding to the requested function in the second function setting 42 is "ON". The CPU 32 proceeds to S20 in a case of determining that the function setting information is "ON" (YES in S36), and proceeds to S38 in a case of determining that the function setting information is "OFF" (NO in S36).

In S38, the CPU 32 determines whether the screen display setting 46 is "ON". The CPU 32 proceeds to S40 in a case of determining that the screen display setting 46 is "ON" (YES in S38), and returns to S10 in a case of determining that the screen display setting 46 is "OFF" (NO in S38).

Figure 4:
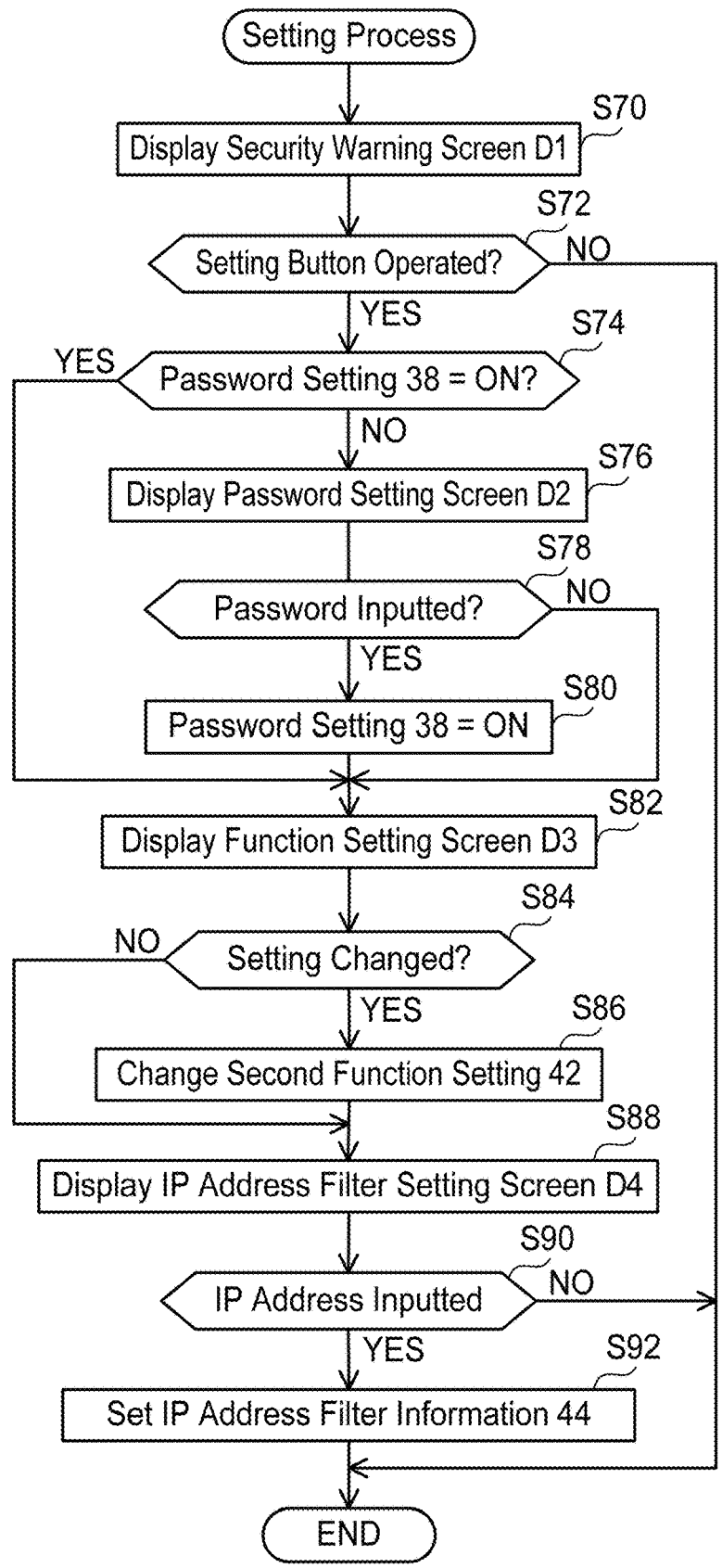
FIG. 4 shows a flowchart of a setting process.

In S40, the CPU 32 executes a setting process (see FIG. 4). The setting process is a process for designating the password setting 38, the second function setting 42, and the IP address filter information 44. When S40 is completed, the CPU 32 returns to S10.

Moreover, in S50, the CPU 32 determines whether the function setting information corresponding to the requested function in the first function setting 40 is "ON". The CPU 32 proceeds to S20 in a case of determining that the function setting information is "ON" (YES in S50), and returns to S10 in a case of determining that the function setting information is "OFF" (NO in S50).

(Setting Process: FIG. 4)

Figure 6A:
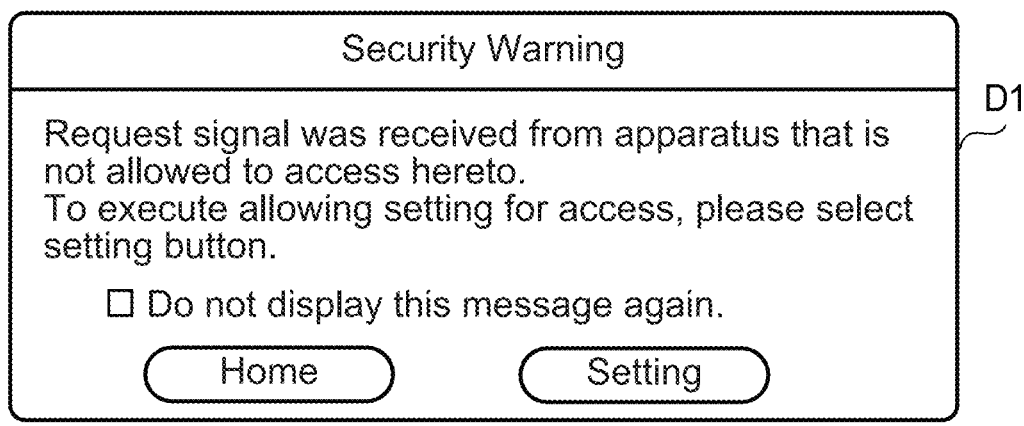
FIGS. 6A to 6D show screens displayed on the MFP.

Next, with reference to FIG. 4, description will be given on the setting process executed in S40 in FIG. 3. In S70, the CPU 32 displays the security warning screen D1 on the display unit 14. As shown in FIG. 6A, the screen D1 includes a message indicating that a request signal has been received from an apparatus that is not allowed to access the MFP 10, a message indicating that display of this screen can be disabled, a checkbox, a home button, and a setting button. An administrator of the MFP 10 can thereby know that the request signal has been received from the apparatus that is not allowed to access the MFP 10.

In S72, the CPU 32 determines whether the setting button in the screen D1 has been operated. In a case where the setting button has been operated (YES in S72), the CPU 32 proceeds to S74. On the other hand, in a case where the home button has been operated (NO in S72), the CPU 32 displays a home screen of the MFP 10 on the display unit 14, and terminates the process in FIG. 4. Notably, in a case where a user selects the home button or the setting button with the checkbox checked, the CPU 32 changes the screen display setting 46 from "ON" to "OFF". Consequently, when S38 in FIG. 3 is executed in response to subsequent reception of a request signal, a NO determination is made in S38, so that the setting process in FIG. 4 is not executed. As such, the MFP 10 can switch between execution and not execution of the setting process in accordance with a user's intention.

S74 is similar to S14 in FIG. 3. The CPU 32 proceeds to S76 in a case of making a NO determination in S74, and proceeds to S82 in a case of making a YES determination in S74.

Figure 6B:
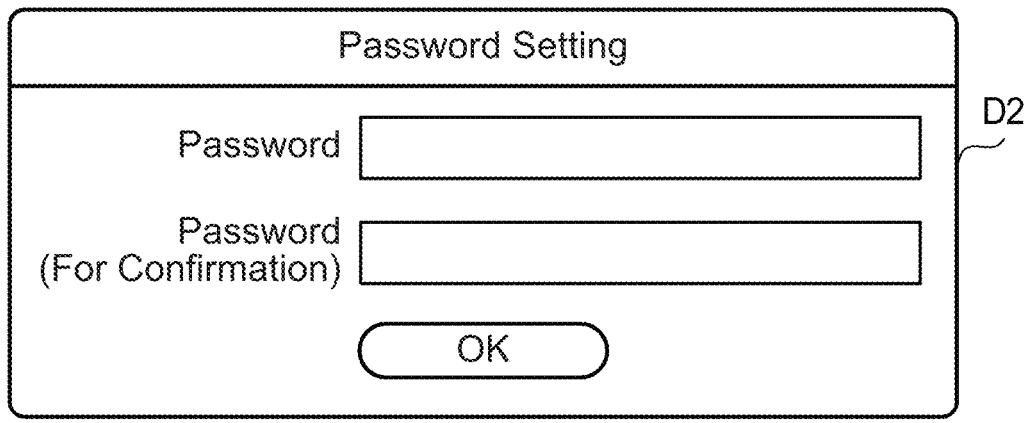

In S76, the CPU 32 displays a password setting screen D2 on the display unit 14. As shown in FIG. 6B, the screen D2 includes a password input field, a password input field for confirmation, and an OK button.

In S78, when the OK button is operated, the CPU 32 determines whether same character strings have been inputted respectively into the input fields in the screen D2. In a case of determining that the same character strings have been inputted respectively into the input fields, the CPU 32 makes a YES determination in S78, and proceeds to S80. On the other hand, in a case of determining that no character string has been inputted into at least one of the input fields, or in a case of determining that different character strings have been inputted respectively into the input fields, the CPU 32 makes a NO determination in S78, and proceeds to S82.

In S80, the CPU 32 changes the password setting 38 from "OFF" to "ON". In S80, the CPU 32 further causes the memory 34 to store the character string described in the password input field, as a password.

Figure 6C:
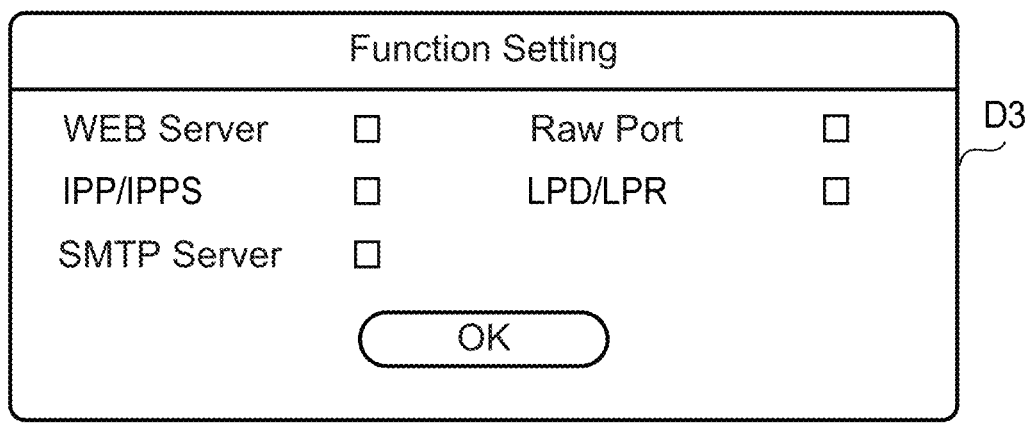

In S82, the CPU 32 displays a function setting screen D3 on the display unit 14. As shown in FIG. 6C, the screen D3 includes multiple function names, and checkboxes respectively corresponding to the function names. Moreover, the screen D3 includes an OK button.

In S84, when the OK button is operated, the CPU 32 determines whether the setting in the screen D3 has been changed. Specifically, in a case where any of the checkboxes is newly checked or unchecked in comparison with a state of the checkboxes in the screen D3 as of S82, the CPU 32 makes a YES determination in S84, and proceeds to S86. On the other hand, in a case where none of the checkboxes is newly checked or unchecked in comparison with the state of the checkboxes in the screen D3 as of S82, the CPU 32 makes a NO determination in S84, and proceeds to S88.

In S86, the CPU 32 specifies, in the screen D3, the function name corresponding to the checked checkbox, and sets the function setting information corresponding to the specified function name in the second function setting 42 to "ON". Moreover, the CPU 32 specifies, in the screen D3, the function name corresponding to the unchecked checkbox, and sets the function setting information corresponding to the specified function name in the second function setting 42 to "OFF".

Figure 6D:
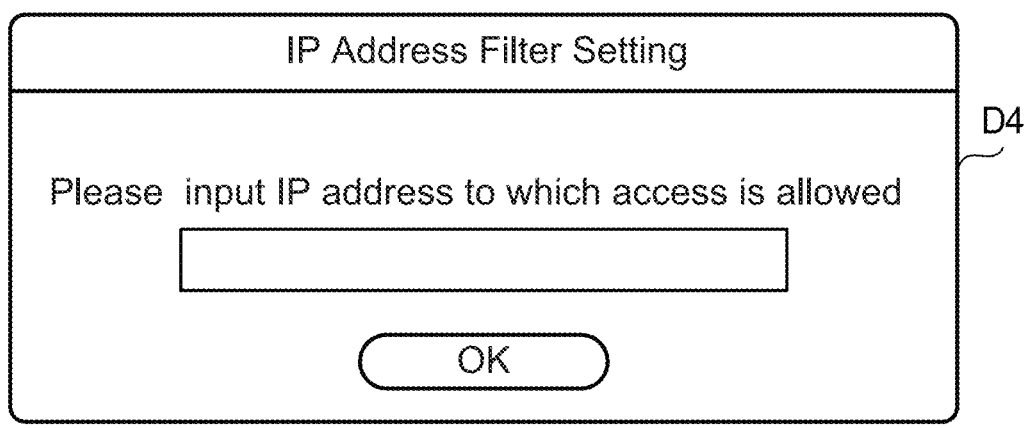

In S88, the CPU 32 displays an IP address filter setting screen D4 on the display unit 14. As shown in FIG. 6D, the screen D4 includes a message for encouraging a user to input an IP address, an IP address input field, and an OK button. A user can input an IP address or a range of IP addresses into the IP address input field.

In S90, when the OK button is operated, the CPU 32 determines whether an IP address has been inputted into the IP address input field. The CPU 32 proceeds to S92 in a case of determining that an IP address has been inputted into the IP address input field (YES in S90), and terminates the process in FIG. 4 in a case of determining that no IP address is inputted into the IP address input field (NO in S90).

In S92, the CPU 32 causes the memory 34 to store the IP address inputted into the input field in the screen D4, as the IP address filter information 44. When S92 is completed, the CPU 32 terminates the process in FIG. 4.

Figure 5:
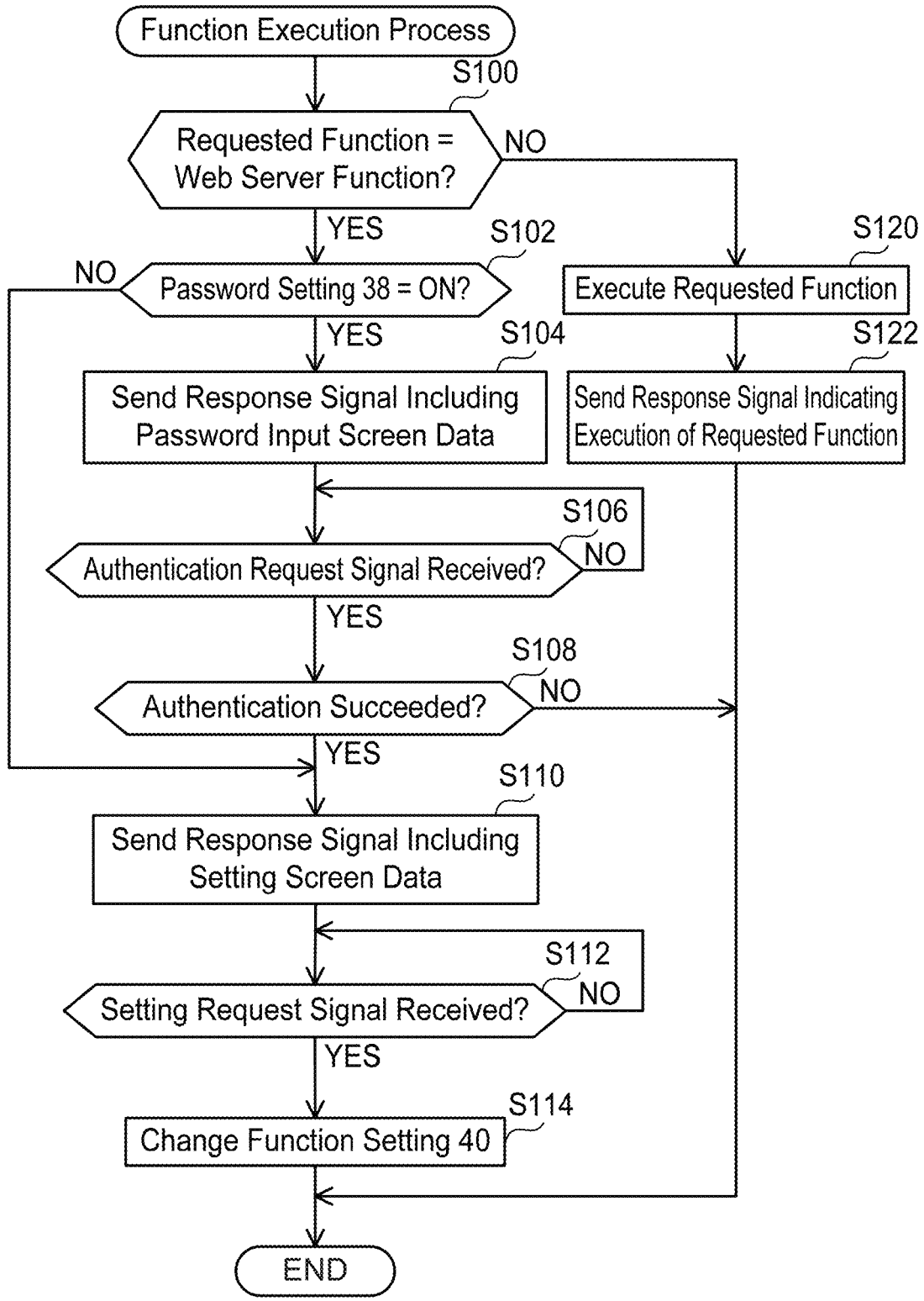
FIG. 5 shows a flowchart of a function execution process.

(Function Execution Process: FIG. 5)

Next, with reference to FIG. 5, description will be given on the function execution process executed in S20 in FIG. 3. In S100, the CPU 32 determines whether the requested function specified in S12 in FIG. 3 is the Web server function. The CPU 32 proceeds to S102 in a case where the requested function is the Web server function (YES in S100), and proceeds to S120 in a case where the requested function is not the Web server function (NO in S100).

S102 is similar to S14 in FIG. 3. The CPU 32 proceeds to S104 in a case of making a YES determination in S102, and proceeds to S110 in a case of making a NO determination in S102.

In S104, the CPU 32 sends a response signal to the target PC. The response signal includes the sender IP address "GIPm", a destination IP address (i.e., the sender (i.e., the target PC) IP address included in the request signal), and password input screen data. The password input screen data is data for displaying a screen that requests an input of a password on a display unit of the target PC.

In S106, the CPU 32 monitors reception of an authentication request signal that includes a password from the target PC. When receiving the authentication request signal from the target PC (YES in S106), the CPU 32 proceeds to S108.

In S108, the CPU 32 authenticates the password. In a case where the password in the memory 34 is identical to the password in the authentication request signal, the CPU 32 determines that the authentication has succeeded (YES in S108), and proceeds to S110. In a case where the password in the memory 34 is not identical to the password in the authentication request signal, the CPU 32 determines that the authentication has failed (NO in S108), and terminates the process in FIG. 5.

In S110, the CPU 32 sends a response signal to the target PC. The response signal includes the sender IP address "GIPm", the destination IP address (i.e., the IP address of the target PC), and setting screen data. The setting screen data is data for displaying a setting screen D6 (see T20 in FIG. 7) on the display unit of the target PC.

In S112, the CPU 32 monitors reception of a setting request signal that includes setting change information from the target PC. The setting change information is information for instructing change of the function setting information in the first function setting 40. When receiving the setting request signal from the target PC (YES in S112), the CPU 32 proceeds to S114.

In S114, the CPU 32 changes the function setting information in the first function setting 40 in accordance with the setting change information in the setting request signal. When S114 is completed, the process in FIG. 5 is terminated.

Moreover, in S120, the CPU 32 executes the requested function. In a case where the requested function is the IPP/IPPS function, the Raw port function, or the LPD/LPR function, the CPU 32 executes the process in accordance with the request signal to thereby execute print in accordance with the print data. Moreover, in a case where the requested function is the SMTP server function, the CPU 32 executes the process in accordance with the request signal to thereby execute print in accordance with a file attached to the electronic mail.

In S122, the CPU 32 sends, to the target PC, a response signal indicating that the requested function has been executed. When S122 is completed, the process in FIG. 5 is terminated.

(Specific Cases)

Next, with reference to FIGS. 7 to 12, description will be given on specific cases implemented by the processes in FIGS. 3 to 5.

(Case A: FIG. 7)

Case A is a case where the MFP 10 receives a request signal from the PC 100A. In an initial state of Case A, all of the function setting information in the first function setting 40 is set to "ON", and all of the function setting information in the second function setting 42 is set to "OFF". Moreover, the password setting 38 and the screen display setting 46 are set to "OFF", and no allowed IP address is registered in the IP address filter information 44.

When accepting an input of the GIPm of the MFP 10 at T10 in a state of having a Web browser activated, the PC 100A sends, at T12, a request signal that includes the sender IP address "GIPa", the destination IP address "GIPm", and the requested function information "Web server function" to the MFP 10.

When receiving the request signal from the PC 100A at T12 (YES in S10 in FIG. 3), the MFP 10 specifies the Web server function as a requested function (S12), and determines that the password setting 38 is "OFF" (NO in S14). Moreover, the MFP 10 determines that the sender IP address "GIPa" is a GIP (YES in S30), determines that the network address ("128.1") of the MFP 10 is identical to a specific network address obtained from the sender IP address "GIPa" (YES in S32), and determines that the function setting information corresponding to the Web server function in the first function setting 40 is "ON" (YES in S50). Moreover, the MFP 10 determines that the requested function is the Web server function (YES in S100 in FIG. 5), and determines that the password setting 38 is "OFF" (NO in S102). In this case, the MFP 10 sends, at T14, a response signal that includes the sender IP address "GIPm", the destination IP address "GIPa", and setting screen data to the PC 100A (S110).

When receiving the response signal at T14, the PC 100A displays the setting screen D6 at T20. The setting screen D6 includes multiple function names, and checkboxes respectively corresponding to the function names. The screen D6 further includes an OK button and a cancel button. At present, all of the function setting information is "ON" in the first function setting 40 of the MFP 10, and as such, all of the checkboxes are checked.

When an operation for unchecking the checkbox corresponding to the IPP/IPPS function is performed at T22, and the OK button is operated at T24, the PC 100A sends, at T26, a setting request signal that includes the sender IP address "GIPa", the destination IP address "GIPm", and the setting change information "IPP/IPPS=OFF" to the MFP 10.

When receiving the setting request signal from the PC 100A at T26 (YES in S112), the MFP 10 changes, at T28, the function setting information corresponding to the IPP/IPPS function in the first function setting 40 from "ON" to "OFF" (S114). This results in that, even if a request signal for the IPP/IPPS function is received from a PC (e.g., the PC 100A, the PC 100B) related to the facility 80 (YES in S10 in FIG. 3), the MFP 10 does not execute the IPP/IPPS function (a NO determination is made in S50, and S20 is not executed).

The MFP 10 can receive a request signal from a PC inside the facility 80 or a PC outside the facility 80. However, the PC outside the facility 80 may possibly be a PC of a third party that is not related to the facility 80. In a case of receiving a request signal from a PC of a third party, the MFP 10 should not execute the function execution process (S20 in FIG. 3) in response to the request signal. A sender IP address included in the request signal received from the PC of the third party outside the facility 80 is a GIP. The present embodiment is therefore configured such that, in a case of receiving a request signal from the target PC (YES in S10 in FIG. 3), the MFP 10 determines whether the sender IP address is a GIP (S30). In a case where the sender IP address is a GIP (YES in S30), the MFP 10 further determines whether the network address of the MFP 10 is identical to a specific network address obtained from the sender IP address (S32) in view of the possibility that the target PC may be a PC of a third party. Here, in a case where it is determined that the network addresses are not identical (NO in S32), the target PC is highly possibly a PC of a third party. On the other hand, in Case A, the MFP 10 receives a request signal from the PC 100A that belongs to the same network 6 in the facility 80 (T12). Therefore, even if the sender IP address "GIPa" is a GIP (YES in S30), the MFP 10 determines that the network addresses are identical (YES in S32), executes the function execution process of S20, and sends a response signal to the PC 100A (T14). As such, even if the sender IP address "GIPa" is a GIP, in a case where the sender PC 100A is a PC that belongs to the same network 6, the MFP 10 can execute the function execution process and appropriately send the response signal to the PC 100A.

Figure 8:
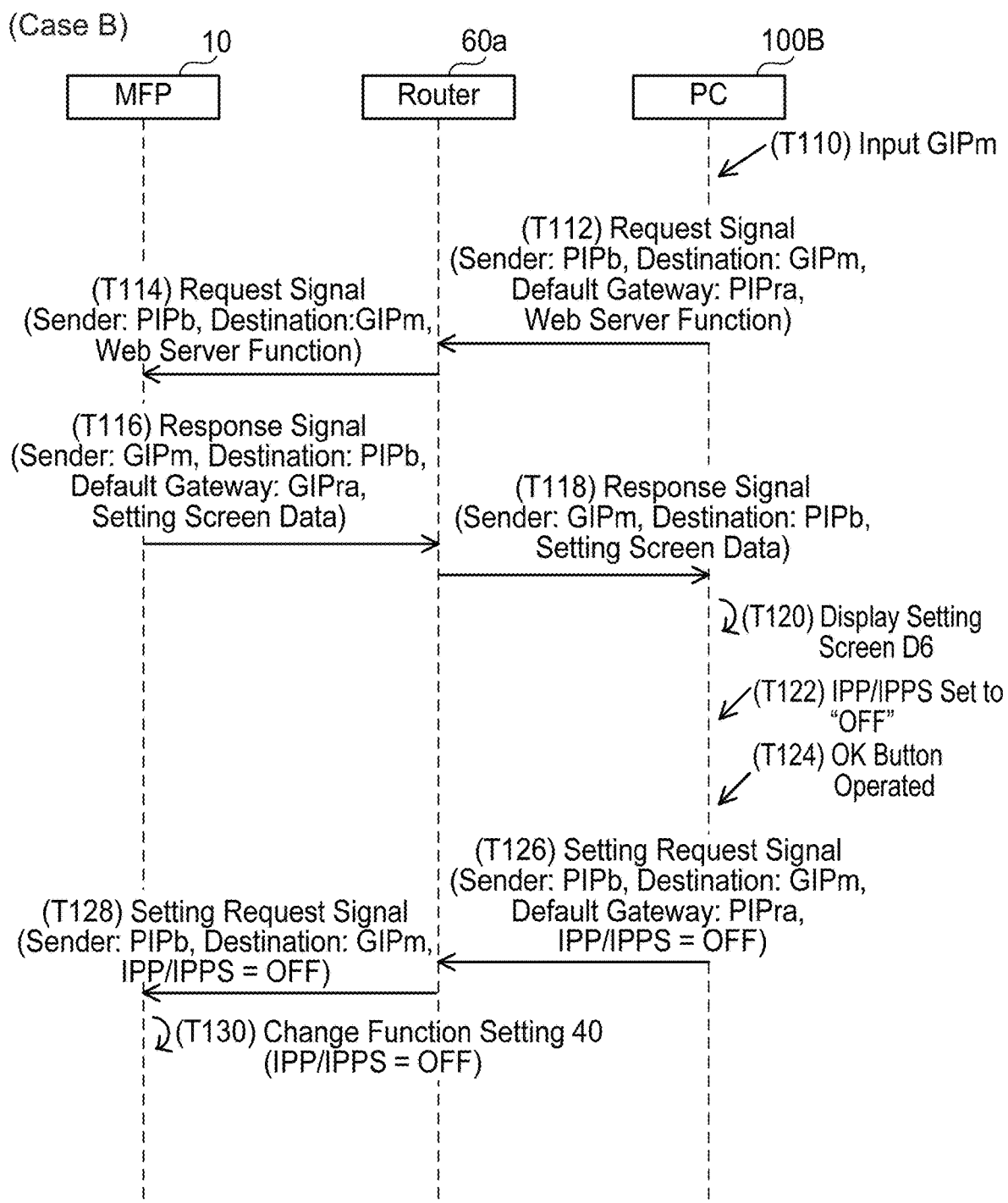
FIG. 8 shows a sequence diagram in Case B where the MFP receives the request signal from a PC via a router.

(Case B: FIG. 8)

Case B is a case where the MFP 10 receives a request signal from the PC 100B via the router 60a. An initial state of Case B is similar to the initial state of Case A (FIG. 7).

When accepting an input of the GIPm at T110, the PC 100B sends, at T112, a request signal that includes the sender IP address "PIPb", the destination IP address "GIPm", the default gateway IP address "PIPra", and the function information "Web server function" to the router 60a.

When receiving the request signal from the PC 100B at T112, the router 60a sends, at T114, a request signal that includes the sender IP address "PIPb", the destination IP address "GIPm", and the requested function information "Web server function" to the MFP 10.

When receiving the request signal from the router 60a at T114 (YES in S10), the MFP 10 specifies the Web server function as the requested function (S12), and determines that the password setting 38 is "OFF" (NO in S14). Moreover, the MFP 10 determines that the sender IP address "PIPb" is not a GIP (NO in S30), and determines that the function setting information corresponding to the Web server function in the first function setting 40 is "ON" (YES in S50). Moreover, the MFP 10 determines that the requested function is the Web server function (YES in S100 in FIG. 5), and determines that the password setting 38 is "OFF" (NO in S102). In this case, the MFP 10 sends, at T116, a response signal that includes the sender IP address "GIPm", the destination IP address "PIPb", the default gateway IP address "GIPra", and the setting screen data to the router 60a (S110).

When receiving the response signal from the MFP 10 at T116, the router 60a sends, at T118, a response signal that includes the sender IP address "GIPm", the destination IP address "PIPb", and the setting screen data to the PC 100B.

T120 to T124 are similar to T20 to T24 in FIG. 7. T126 and T128 are similar to T26 in FIG. 7 except that the communication is targeted at the PC 100B and is executed via the router 60a. T130 is similar to T28.

As shown in Case B, in a case of receiving the request signal from the PC 100B in the facility 80 (T112), the MFP 10 can determine that the sender IP address "PIPb" is a PIP (NO in S30), in other words, can determine that the sender PC 100B is a PC in the facility 80, and execute the function execution process and appropriately send a response signal to the PC 100B.

Figure 9:
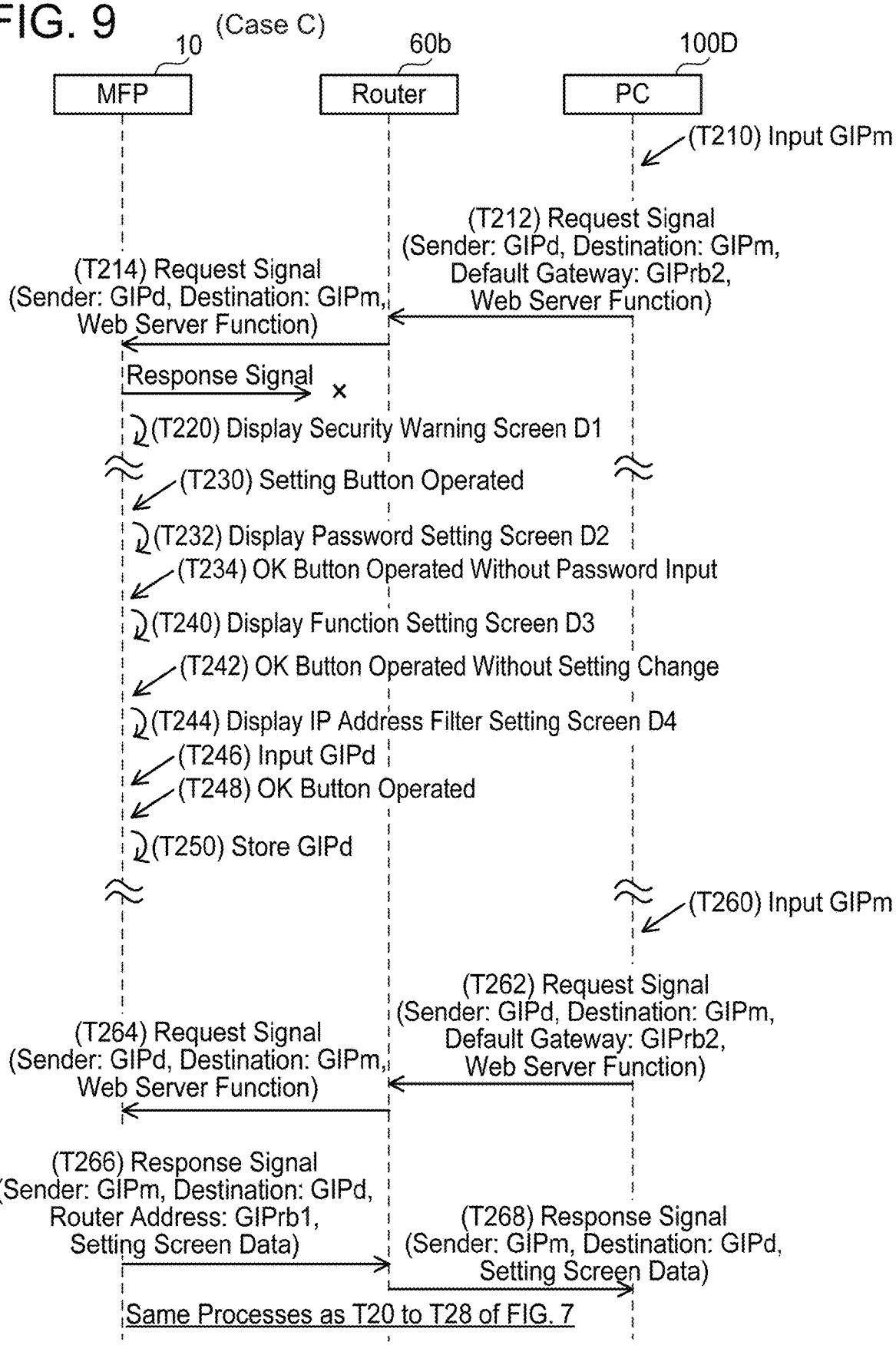
FIG. 9 shows a sequence diagram in Case C where the MFP restricts sending of a response signal.

(Case C: FIG. 9)

Case C is a case where the MFP 10 receives a request signal from the PC 100D via the router 60b. An initial state of Case C is similar to the initial state of Case A (FIG. 7).

T210 to T214 are similar to T110 to T114 in FIG. 8 except that the communication is targeted at the PC 100D and is executed via the router 60b. When receiving the request signal from the router 60b at T214 (YES in S10 in FIG. 3), the MFP 10 specifies the Web server function as the requested function (S12), and determines that the password setting 38 is "OPP" (NO in S14). Moreover, the MFP 10 determines that the sender IP address "GIPd" is a GIP (YES in S30), determines that the network address ("128.1") of the MFP 10 is not identical to the specific network address ("128.2") (NO in S32), determines that the GIPd is not an allowed IP address (NO in S34), determines that the function setting information corresponding to the Web server function in the second function setting 42 is "OFF" (NO in S36), and determines that the screen display setting 46 is "ON" (YES in S38). In this case, the MFP 10 does not send a response signal to the request signal received at T214, and displays the security warning screen D1 (see FIG. 6A) at T220 (S70 in FIG. 4).

Since the setting screen D6 (see T20 in FIG. 7) is not displayed, a user of the PC 100D can know that he/she cannot use the MFP 10. The user then notifies the administrator of the MFP 10 that he/she cannot use the MFP 10. In this case, since the PC 100D is a PC in the facility 80, the administrator performs the following operation for registering the GIPd of the PC 100D in the IP address filter information 44, so as to enable the PC 100D to use the MFP 10.

When accepting an operation of the setting button from the administrator at T230 (YES in S72), the MFP 10 determines that the password setting 38 is "OFF" (NO in S74), and displays the password setting screen D2 (see FIG. 6B) at T232 (S76). Next, when accepting an operation of the OK button at T234 without any inputted password, the MFP 10 determines that no password is inputted into the password input field (NO in S78), and displays the function setting screen D3 (see FIG. 6C) at T240 (S82).

When accepting an operation of the OK button at T242 without any change of the setting, the MFP 10 determines that the setting is not changed (NO in S84), and displays the IP address filter setting screen D4 (see FIG. 6D) at T244 (S88). When accepting an input of the GIPd into the IP address input field at T246, and accepting an operation of the OK button at T248, the MFP 10 then determines that the GIPd is inputted into the IP address input field (YES in S90). In this case, the MFP 10 stores the GIPd as the IP address filter information 44 at T250 (S92). Subsequently, the administrator notifies the user of the PC 100D that the GIPd has been registered in the IP address filter information 44.

Subsequently, the user of the PC 100D can use the Web server function of the MFP 10 by using the PC 100D. T260 to T264 are similar to T210 to T214. T266 and T268 are similar to T14 in FIG. 7 except that the communication is targeted at the PC 100D and is executed via the router 60b. Subsequently, processes similar to T20 to T28 are executed between the MFP 10 and the PC 100D. Setting of the function setting information corresponding to the IPP/IPPS function in the first function setting 40 is thereby completed.

As shown in Case C, the MFP 10 can register the GIP "GIPd" of the PC 100D installed in the facility 80, as the IP address filter information 44. In this case, even if the sender IP address "GIPd" is a GIP, the MFP 10 executes the function execution process (S20), and sends a response signal to the PC 100D (T266, T268). As such, even if the sender IP address "GIPd" is a GIP, in a case where the sender PC 100D is installed in the same facility 80, the MFP 10 can execute the function execution process and appropriately send a response signal to the PC 100D.

Figure 10:
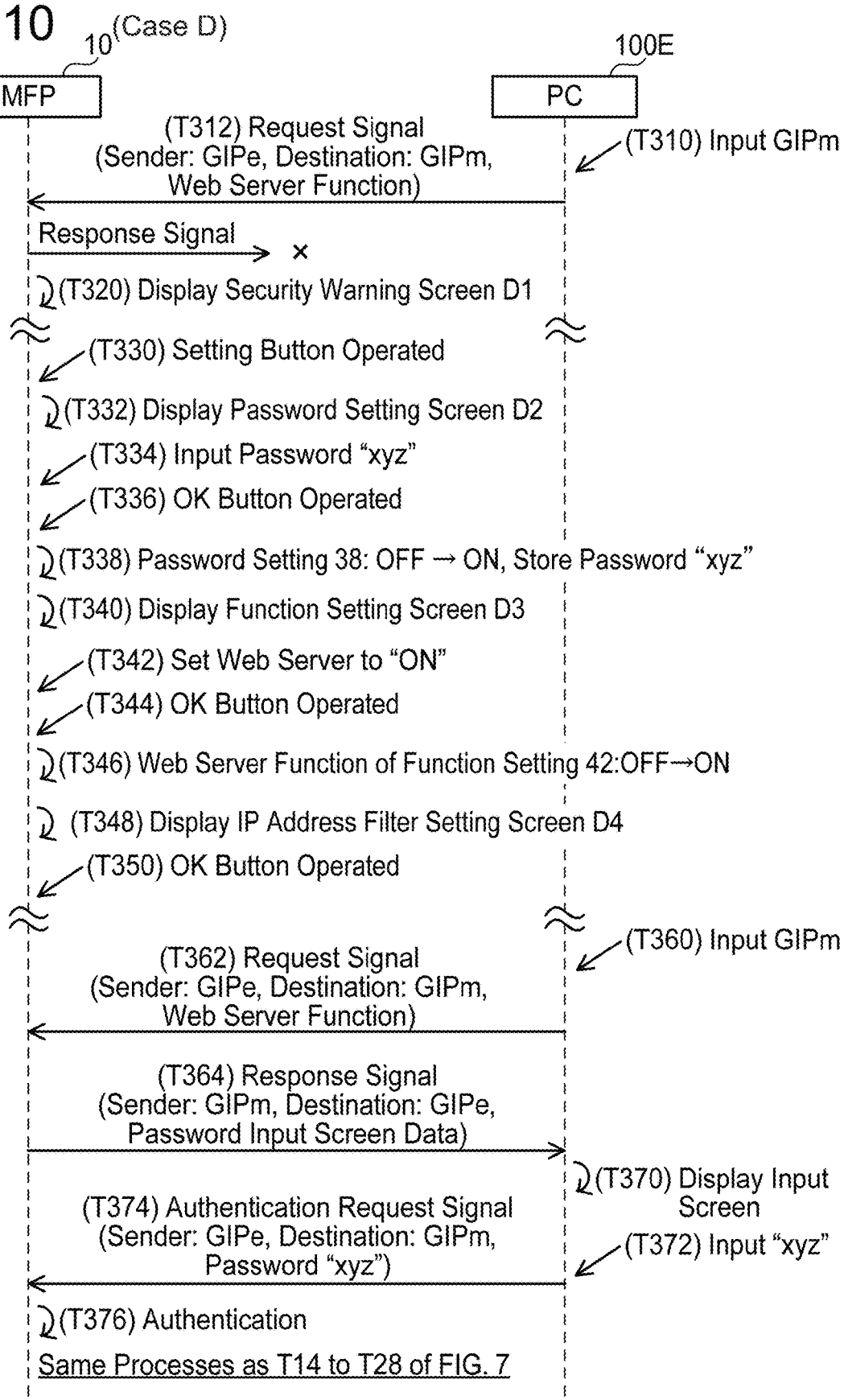
FIG. 10 shows a sequence diagram in Case D where the MFP restricts sending of a response signal.

(Case D: FIG. 10)

Case D is a case where the MFP 10 receives a request signal from the PC 100E via the Internet 4. The present case assumes a circumstance in which a user who works in the facility 80 uses the PC 100E during a business trip. An initial state of Case D is similar to the initial state of Case A (FIG. 7).

T310 and T312 are similar to T10 and T12 in FIG. 7 except that the communication is targeted at the PC 100E and a request signal is sent via the Internet 4. When receiving the request signal from the PC 100E at T312 (YES in S10 in FIG. 3), the MFP 10 specifies the Web server function as the requested function (S12), and determines that the password setting 38 is "OPP" (NO in S14). Moreover, the CPU 32 determines that the sender IP address "GIPe" is a GIP (YES in S30), determines that the network address ("128.1") of the MFP 10 is not identical to the specific network address ("192.0") (NO in S32), determines that the sender IP address "GIPe" is not an allowed IP address (NO in S34), determines that the function setting information corresponding to the Web server function in the second function setting 42 is "OFF" (NO in S36), and determines that the screen display setting 46 is "ON" (YES in S38). In this case, the MFP 10 displays the security warning screen D1 (see FIG. 6A) at T320 (S70 in FIG. 4).

Since the setting screen D6 (see T20 in FIG. 7) is not displayed, the user of the PC 100E can know that he/she cannot use the MFP 10. The user then notifies the administrator of the MFP 10 that he/she cannot use the MFP 10. In this case, since the PC 100E is a PC related to the facility 80, the administrator performs the following operation for setting the function setting information corresponding to the Web server function in the second function setting 42 to "ON", so as to enable the PC 100E to use the MFP 10.

T330 and T332 are respectively similar to T230 and T232 in FIG. 9. The MFP 10 accepts an input of a password "xyz" into each input field of the password setting screen D2 (see FIG. 6B) at T334, and when accepting an operation of the OK button at T336, determines that the passwords respectively inputted into the input fields are identical (YES in S78). In this case, the MFP 10 changes the password setting 38 from "OFF" to "ON" and stores the password "xyz" at T338. T340 is similar to T240. The MFP 10 accepts checking of the checkbox corresponding to the Web server function in the function setting screen D3 at T342, and when accepting an operation of the OK button at T344, determines that the setting of the Web server function has been changed (YES in S84), and changes the function setting information corresponding to the Web server function in the second function setting 42 from "OFF" to "ON" at T346 (S86). T348 and T350 are respectively similar to T244 and T248. Subsequently, the administrator notifies the user of the PC 100E that the setting of the function setting information corresponding to the Web server function in the second function setting 42 and the setting of the password "xyz" have been completed.

Subsequently, the user of the PC 100E can use the Web server function of the MFP 10 by using the PC 100E. T360 and T362 are respectively similar to T310 and T312.

When receiving a request signal from the PC 100E at T362 (YES in S10 in FIG. 3), the MFP 10 specifies the Web server function as the requested function (S12), determines that the password setting 38 is "ON" (YES in S14), and determines that the function setting information corresponding to the Web server function in each of the function settings 40, 42 is "ON" (YES in S16). Moreover, the MFP 10 determines that the requested function is the Web server function (YES in S100 in FIG. 5), and determines that the password setting 38 is "ON" (YES in S102). In this case, the MFP 10 sends, at T364, a response signal that includes the sender IP address "GIPm", the destination IP address "GIPe", and the password input screen data to the PC 100E (S104).

When receiving the response signal from the MFP 10, the PC 100E displays an input screen at T370. When accepting an input of the password "xyz" at T372, the PC 100E sends, at T374, an authentication request signal that includes the sender IP address "GIPe", the destination IP address "GIPm", and the password "xyz" to the MFP 10.

When receiving the authentication request signal from the PC 100E at T374 (YES in S106), the MFP 10 determines, at T376, that the password stored at T338 is identical to the password in the authentication request signal, and determines that the authentication has succeeded (YES in S108). Subsequently, processes similar to T14 to T28 in FIG. 7 are executed between the MFP 10 and the PC 100E. The setting of the function setting information corresponding to the IPP/IPPS function in the first function setting 40 is thereby completed.

As shown in Case D, the MFP 10 can set the function setting information corresponding to the Web server function in the second function setting 42 to "ON", set the password setting 38 to ON, and set the password "xyz". In this case, even if the sender IP address "GIPe" is a GIP, in a case where the authentication of the password succeeds (T376), the MFP 10 sends a response signal for executing the Web server function to the PC 100E (T14 in FIG. 7). As such, even if the sender IP address "GIPe" is a GIP, in a case where a user who works in the facility 80 uses the sender PC during a business trip, the MFP 10 can execute the function execution process and appropriately send the response signal to the PC 100E.

Figure 11:
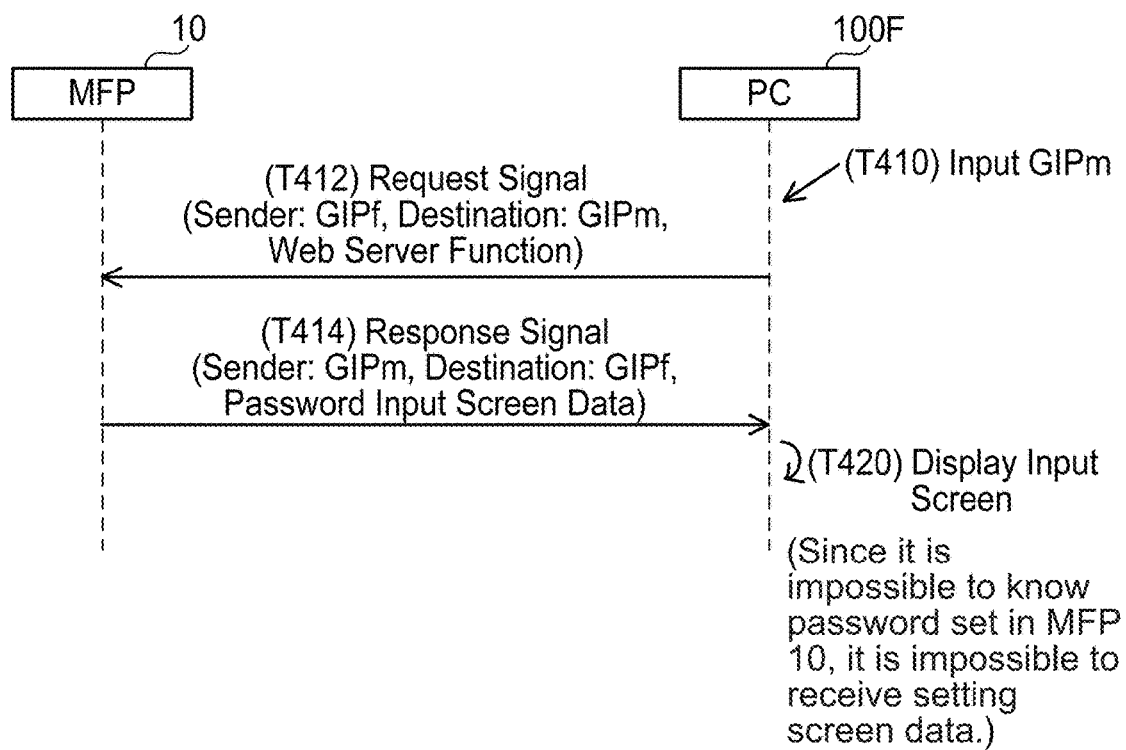
FIG. 11 shows a sequence diagram in Case E where a password input screen is displayed on the PC.

(Case E: FIG. 11)

Case E is a case where the MFP 10 receives a request signal from the PC 100F via the Internet 4. The present case assumes a circumstance in which the PC 100F is used by a third party. Case E is a state after Case D, in other words, a state in which the password setting 38 is set to "ON" and the function setting information corresponding to the Web server function in the second function setting 42 is set to "ON".

T410 to T420 are similar to T360 to T370 in FIG. 10 except that the communication is targeted at the PC 100F. A user of the PC 100F cannot make contact with the administrator of the MFP 10, and hence cannot know the password "xyz" set in the MFP 10. Therefore, the user cannot input the password "xyz", and the PC 100F cannot send an authentication request signal that includes the password "xyz" to the MFP 10. Thus, the MFP 10 does not send a response signal that includes the setting screen data to the PC 100F.

As shown in Case E, since the MFP 10 does not receive the authentication request signal that includes the password "xyz" from the PC 100F, the MFP 10 does not send the response signal that includes the setting screen data to the PC 100F. The setting in the first function setting 40 can therefore be prevented from being changed by a third party.

Figure 12:
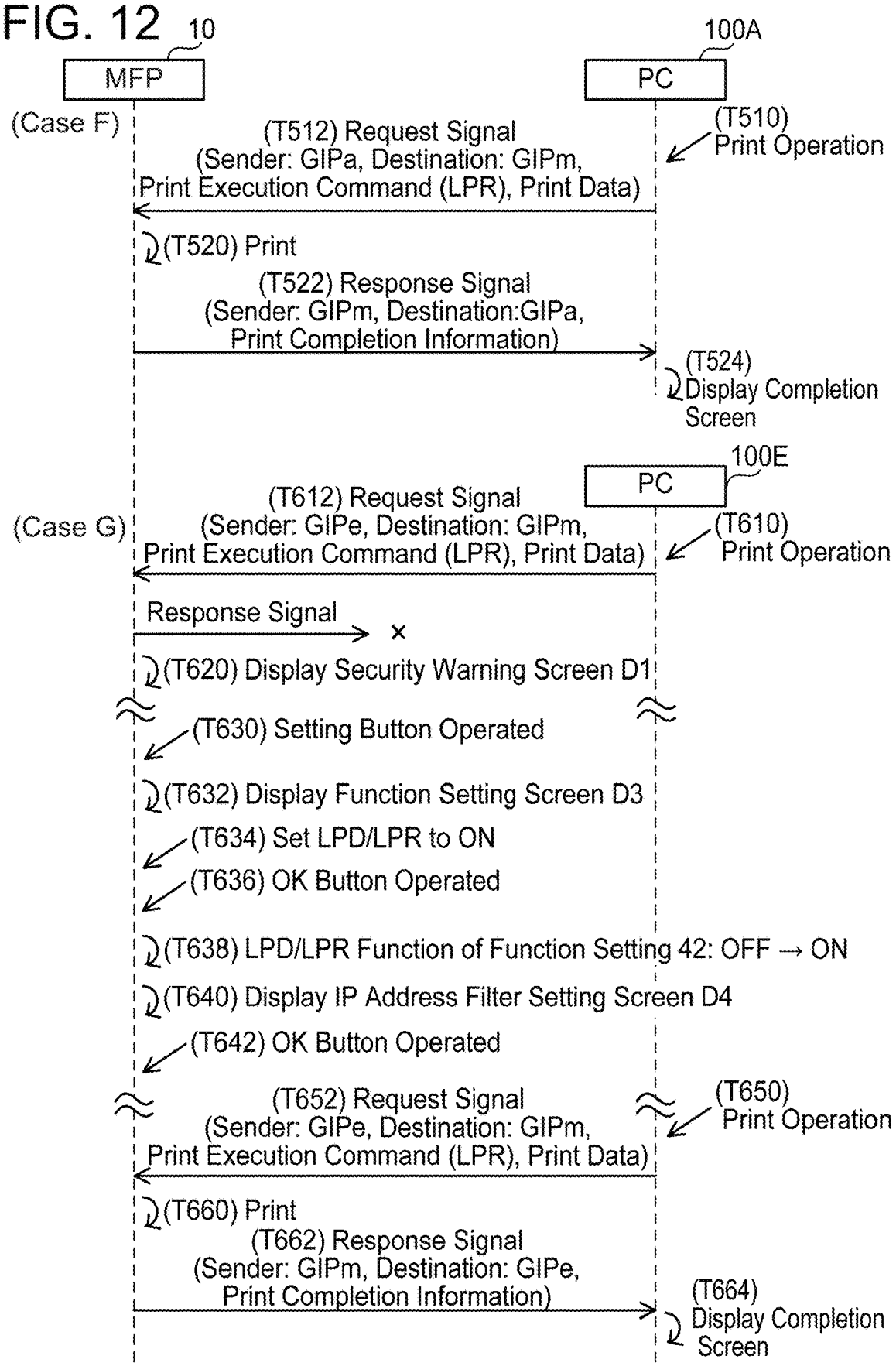
FIG. 12 shows sequence diagrams in Case F where the MFP executes a print function and in Case G where the MFP restricts sending of a response signal.

(Case F: FIG. 12)

Case F is a case where the MFP 10 receives a request signal from the PC 100A. An initial state of Case F is similar to the initial state of Case A.

At T510, the PC 100A accepts a print operation for executing print in accordance with an LPR protocol. T512 is similar to T12 in FIG. 7 except that the request signal includes a print execution command (LPR) and print data. The print execution command (LPR) is a command for causing the MFP 10 to execute print in accordance with the LPR protocol, and is also information indicating that a requested function is the LPD/LPR function. When receiving a request signal from the PC 100A at T512 (YES in S10 in FIG. 3), the MFP 10 specifies the LPD/LPR function as the requested function (S12), and determines that the password setting 38 is "OFF" (NO in S14). Moreover, the MFP 10 determines that the GIPa is a GIP (YES in S30), determines that the network address ("128.1") of the MFP 10 is identical to the specific network address ("128.1") (YES in S32), and determines that the function setting information corresponding to the LPD/LPR function in the first function setting 40 is "ON" (YES in S50). Moreover, the MFP 10 determines that the specific requested function is not the Web server function (NO in S100 in FIG. 5), executes print of the print data in the request signal at T520 (S120), and sends a response signal that includes the sender IP address "GIPm", the destination IP address "GIPa", and print completion information to the PC 100A at T522 (S122).

When receiving the response signal from the MFP 10 at T522, the PC 100A displays, at T524, a completion screen indicating that the print has been completed. The user of the PC 100A can thereby know that the print has been completed by the MFP 10.

As shown in Case F, even if the sender IP address "GIPa" is a GIP (YES in S30), the MFP 10 can determine that the network addresses are identical (YES in S32), execute the function execution process of S20, and appropriately send the response signal to the PC 100A.

(Case G: FIG. 12)

In Case G, the MFP 10 receives a request signal from the PC 100E. Case G is a state after Case D, in other words, a state in which the password setting 38 is set to "ON", and the function setting information corresponding to the Web server function in the second function setting 42 is set to "ON".

T610 and T612 are similar to T510 and T512 except that the communication is targeted at the PC 100E. When receiving the request signal from the PC 100E at T612 (YES in S10), the MFP 10 specifies the LPD/LPR function as the requested function (S12), determines that the password setting 38 is "ON" (YES in S14), and determines that the function setting information corresponding to the LPD/LPR function in the second function setting 42 is not "ON" (NO in S16). Moreover, the CPU 32 determines that the GIPe is a GIP (YES in S30), determines that the network address ("128.1") of the MFP 10 is not identical to the specific network address ("192.0") (NO in S32), determines that the GIPe is not an allowed IP address (NO in S34), determines that the function setting information corresponding to the LPD/LPR function in the second function setting 42 is not "ON" (NO in S36), and determines that the screen display setting 46 is "ON" (YES in S38). In this case, the MFP 10 displays the security warning screen D1 (see FIG. 6A) at T620 (S70 in FIG. 4).

Since the completion screen is not displayed, the user of the PC 100E can know that he/she cannot use the MFP 10. The user then notifies the administrator of the MFP 10 that he/she cannot use the MFP 10. In this case, since the PC 100E is a PC related to the facility 80, the administrator performs the following operation for setting the function setting information corresponding to the LPD/LPR function in the second function setting 42 to "ON", so as to enable the PC 100E to use the MFP 10.

When accepting an operation of the setting button at T630 (YES in S72), the MFP 10 determines that the password setting 38 is "ON" (YES in S74), and displays the function setting screen D3 at T632 (S82). T634 to T642 are similar to T342 to T350 in FIG. 10 except that the function setting information corresponding to the LPD/LPR function in the second function setting 42 is changed from "OPP" to "ON".

T650 and T652 are similar to T610 and T612. In this case, the MFP 10 specifies the LPD/LPR function as the requested function (S12), determines that the password setting 38 is "ON" (YES in S14), and determines that the function setting information corresponding to the LPD/LPR function in each of the function settings 40, 42 is "ON" (YES in S16). T660 to T664 are similar to T520 to T524 except that the communication is targeted at the PC 100E.

As shown in Case G, the MFP 10 can set the function setting information corresponding to the LPD/LPR function in the second function setting 42 to "ON". In this case, even if the sender IP address "GIPe" is a GIP, the MFP 10 can execute the function execution process of S20, and appropriately send the response signal to the PC 100E.

(Effects of Present Embodiment)

As mentioned above, the MFP 10 can receive the request signal from a PC inside the facility 80 or a PC outside the facility 80. However, the PC outside the facility 80 may possibly be a PC of a third party that is not related to the facility 80. Therefore, in the case of receiving the request signal from the PC used by a third party, the MFP 10 needs to restrict sending of the response signal. The present embodiment is therefore configured such that, in the case of receiving, from the target PC, the request signal that includes the IP address of the target PC (YES in S10 in FIG. 3), the MFP 10 determines whether the IP address of the target PC is a GIP (S30). In the case of determining that the IP address of the target PC is not a GIP (NO in S30), the MFP 10 then sends the response signal in response to the request signal to the target PC (S104, S110, S122 in FIG. 5). On the other hand, in the case where it is determined that the IP address of the target PC is a GIP (YES in S30), the sending of the response signal in response to the request signal is restricted (i.e., the execution of S20 is restricted). Consequently, the sending of the response signal to the target PC of a third party that is not related to the facility 80 can be suppressed. As such, the MFP 10 can appropriately switch between executing and restricting the sending of the response signal in response to the request signal.

(Correspondence Relationship)

The MFP 10 is an example of a "communication device", and the PCs 100A to 100F are an example of an "external device". The IP address assigned to each of the PCs 100A to 100F and the IP address assigned to the MFP 10 are respectively examples of a "first IP address" and a "second IP address". The range of the GIPs managed in the JPNIC is an example of a "predetermined range of IP addresses". The GSMm assigned to the MFP 10 is an example of a "subnet mask of the communication device". The "128.1" in the GIPm and the specific network address are respectively examples of a "first network address" and a "second network address". The security warning screen D1 is an example of a "predetermined screen".

The password setting 38 is an example of "setting information" and "information indicating whether password information is being set". In this case, "ON" of the password setting 38 and "OFF" of the password setting 38 are respectively examples of "first information" and "second information".

Moreover, the function setting information corresponding to each function in the second function setting 42 is an example of the "setting information" and "information indicating whether an execution of a function of the communication device is being allowed". In this case, the function setting information "ON" and the function setting information "OFF" are respectively examples of the "first information" and the "second information".

S10 and S30 in FIG. 3 are respectively examples of processes executed by the "receive a request signal from an external device via the communication interface" and the "determine whether the first IP address in the request signal is a global IP address". S110 and S122 in FIG. 5 are an example of a process executed by the "send a response signal to the request signal to the external device".

(Variant 1)

At least one of the processes of S32 and S34 in FIG. 3 may be omitted. In other words, at least one of the "determine whether a first network address is identical to a second network address" and the "determine whether the first IP address in the request signal is identical to the allowed IP address stored in the memory" may be omitted. Notably, in a case where the process of S34 is omitted, the memory 34 in the MFP 10 may not store the IP address filter information 44.

(Variant 2)

The order of the processes of S30, S32, and S34 in FIG. 3 may be changed. For example, the CPU 32 may execute the process of S32, and in a case of making a NO determination in S32, the CPU 32 may execute S30 and S34.

(Variant 3)

The ability to set a password in the MFP 10 may not be needed, and the memory 34 may not store the password setting 38. In the present variant, S14 in FIG. 3, S74 to S80 in FIG. 4, and S102 to S108 in FIG. 5 may be omitted. In other words, the "setting information" may not include the information indicating whether password information is being set.

(Variant 4)

Each of the function settings 40, 42 may not be stored in the memory 34 in the MFP 10. In the present variant, S16, S36, S50 in FIG. 3 and S82 to S86 in FIG. 4 may be omitted. Notably, in the present variant, in a case of making a NO determination in S30, a YES determination in S32, or a YES determination in S34, the CPU 32 proceeds to S20. In a case of making a NO determination in S34, the CPU 32 proceeds to S38. In other words, the "setting information" may not include the information indicating whether an execution of a function of the communication device is being allowed. In simpler terms, the "memory" may not store the "setting information".

(Variant 5)

After making a NO determination in S36 in FIG. 3, the MFP 10 may not display the screens D1 to D4 in FIGS. 6A to 6D on the display unit 14. In other words, S40 in FIG. 3 (the setting process in FIG. 4) may be omitted. In the present variant, the "display a predetermined screen on the display unit" may be omitted.

(Variant 6)

The IP address of the MFP 10 may not be a GIP, but may be a PIP.

(Variant 7)

The processes in FIGS. 3 to 5 in the embodiment are processes executed when communication that uses a higher-level layer (e.g., the application layer) relative to a transport layer in an Open Systems Interconnection (OSI) reference model is executed between the MFP 10 and the target PC. The processes of S30 to S34 in FIG. 3 may also be executed when communication that uses the transport layer and a network layer in the OSI reference model is executed between the MFP 10 and the target PC. In the present variant, in the communication that uses the transport layer and the network layer, the CPU 32 receives an IP address of the target PC, executes processes similar to those of S30 to S34 in FIG. 3 by using the IP address, and temporarily stores the result of the processes in the memory 34. In a case of making a YES determination in S14 or S16, the CPU 32 uses the result of the processes stored in the memory 34.

(Variant 8)

Figure 13:
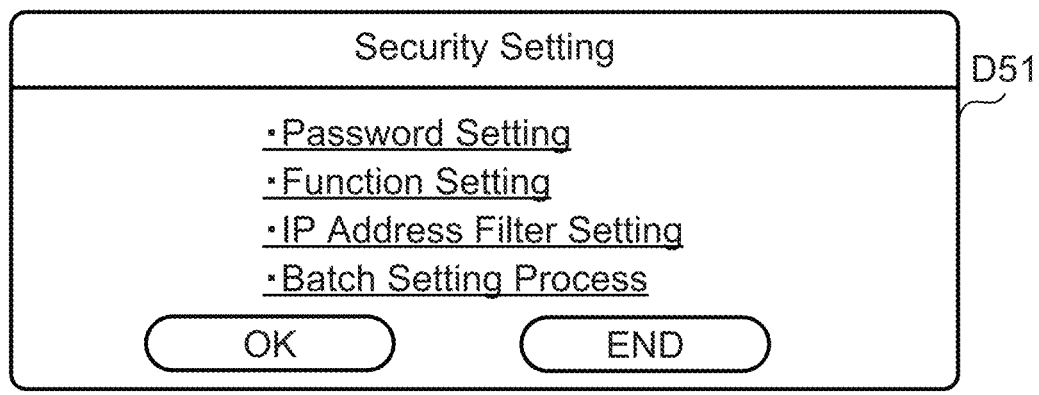
FIG. 13 shows an example of a security setting screen.

In a case where it is determined that the screen display setting 46 is ON in S38 in FIG. 3, the CPU 32 may display a security setting screen D51 (see FIG. 13) on the display unit 14 instead of the security warning screen D1. As shown in FIG. 13, the security setting screen D51 includes selections for a password setting, a function setting, an IP address filter setting, and a batch setting process, an OK button, and an end button. In the present variant, the CPU 32 displays the password setting screen D2 (see FIG. 6B) on the display unit 14 in a case where the password setting is selected, displays the function setting screen D3 (see FIG. 6C) on the display unit 14 in a case where the function setting is selected, and displays the IP address filter setting screen D4 (see FIG. 6D) on the display unit 14 in a case where the IP address filter setting is selected. Moreover, in a case where the batch setting process is selected, the CPU 32 executes the processes of S74 to S92 in FIG. 4. In the present variant, the administrator of the MFP 10 can set the settings individually or in a batched manner (Variant 9)

The "communication device" may not be the MFP 10 capable of executing a plurality of functions, and may also be a printer capable of executing only a print function, a scanner device capable of executing only a scan function, a PC, a server, or the like.

(Variant 10)

In the embodiment above, the processes in FIGS. 3 to 5 are implemented by the CPU 32, which is included in the MFP 10, executing the program 36 (i.e., software). Alternatively, at least one of the processes in FIGS. 3 to 5 may be implemented by hardware such as a logic circuit.

What is claimed is:

1. A communication device comprising:
   a communication interface;
   a processor; and
   a memory storing computer-readable instructions and a second IP address of the communication device and a subnet mask of the communication device,
   wherein the computer-readable instructions, when executed by the processor, cause the communication device to:
   receive a request signal from an external device via the communication interface, the request signal including a first IP address of the external device as a sender address;
   determine whether the first IP address of the external device included in the request signal is a global IP address in a case where the request signal is received from the external device;
   determine whether a first network address is identical to a second network address, the first network address being specified by using the first IP address in the request signal and the subnet mask stored in the memory, and the second network address being specified by using the second IP address stored in the memory and the subnet mask stored in the memory; and
   send a response signal to the request signal to the external device in a case where it is determined that the first IP address is not the global IP address, wherein the response signal is sent to the external device in a case where it is determined that the first IP address is the global IP address and it is determined that the first network address is identical to the second network address, wherein sending of the request signal is restricted in a case where it is determined that the first IP address is the global IP address and it is determined that the first network address is not identical to the second network address.

2. The communication device as in claim 1, wherein it is determined that the first IP address is the global IP address in a case where the first IP address is included in a predetermined range of IP addresses, and
   it is determined that the first IP address is not the global IP address in a case where the first IP address is not included in the predetermined range of IP addresses.

3. The communication device as in claim 1, wherein the memory is further configured to store an allowed IP address to which the sending of the response signal is allowed, and
   the computer-readable instructions, when executed by the processor, further cause the communication device to:
   determine whether the first IP address in the request signal is identical to the allowed IP address stored in the memory,
   wherein the response signal is sent to the external device in a case where it is determined that the first IP address is the global IP address and it is determined that the first IP address is identical to the allowed IP address, and
   the sending of the response signal is restricted in a case where it is determined that the first IP address is the global IP address and it is determined that the first IP address is not identical to the allowed IP address.

4. The communication device as in claim 1, wherein the memory is further configured to store setting information which is related to the sending of the response signal, the response signal is sent to the external device regardless of whether the first IP address is the global IP in a case where the setting information stored in the memory includes first information, the response signal is sent to the external device in a case where the setting information in the memory includes second information different from the first information and it is determined that the first IP address is not the global IP address, and the sending of the response signal is restricted in a case where the setting information in the memory includes the second information and it is determined that the first IP address is the global IP address.

5. The communication device as in claim 4, wherein the setting information includes information indicating whether password information is set, the first information indicates that the password information is being set, and the second information indicates that the password information is not set.

6. The communication device as in claim 4, wherein the setting information includes information indicating whether execution of a function of the communication device is allowed, the first information indicates that the execution of the function is allowed, and the second information indicates that the execution of the function is prohibited.

7. The communication device as in claim 1, wherein the sending of the response signal is restricted by not sending the response signal to the external device, the communication device further comprises a display unit, and the computer-readable instructions, when executed by the processor, further cause the communication device to:

display a predetermined screen on the display unit in the case where it is determined that the first IP address is the global IP address, the predetermined screen indicating that the first IP address is the global IP address.

8. The communication device as in claim 1, wherein the request signal is received from the external device by the communication device operating as a server.

9. The communication device as in claim 1, wherein a second IP address of the communication device is the global IP address.

10. A non-transitory computer-readable recording medium storing computer-readable instructions for a communication device, wherein the computer-readable instructions, when executed by a processor of the communication device, cause the communication device to:

receive a request signal from an external device via a communication interface of the communication device, the request signal including a first IP address of the external device as a sender address;

determine whether the first IP address of the external device included in the request signal is a global IP address in a case where the request signal is received from the external device;

determine whether a first network address is identical to a second network address, the first network address being specified by using the first IP address in the request signal and a subnet mask of the communication device, and the second network address being specified by using a second IP address of the communication device and the subnet mask; and send a response signal to the request signal to the external device in a case where it is determined that the first IP address is not the global IP address, wherein the response signal is sent to the external device in a case where it is determined that the first IP address is the global IP address and it is determined that the first network address is identical to the second network address, wherein sending of the request signal is restricted in a case where it is determined that the first IP address is the global IP address and it is determined that the first network address is not identical to the second network address.

11. A communication device comprising:

a communication interface;

a processor; and a memory storing computer-readable instructions and an allowed IP address to which a sending of a response signal is allowed, wherein, the computer-readable instructions, when executed by the processor, cause the communication device to:

receive a request signal from an external device via the communication interface, the request signal including a first IP address of the external device as a sender address;

determine whether the first IP address of the external device included in the request signal is a global IP address in a case where the request signal is received from the external device;

determine whether the first IP address in the request signal is identical to the allowed IP address stored in the memory, and send the response signal to the request signal to the external device in a case where it is determined that the first IP address is not the global IP address, wherein the response signal is sent to the external device in a case where it is determined that the first IP address is the global IP address and it is determined that the first network address is identical to the second network address, wherein sending of the request signal is restricted in a case where it is determined that the first IP address is the global IP address and it is determined that the first network address is not identical to the second network address.

12. The communication device as in claim 11, wherein it is determined that the first IP address is the global IP address in a case where the first IP address is included in a predetermined range of IP addresses, and it is determined that the first IP address is not the global IP address in a case where the first IP address is not included in the predetermined range of IP addresses.

13. The communication device as in claim 11, wherein the memory is further configured to store setting information which is related to the sending of the response signal, the response signal is sent to the external device regardless of whether the first IP address is the global IP in a case where the setting information stored in the memory includes first information, the response signal is sent to the external device in a case where the setting information in the memory includes second information different from the first information and it is determined that the first IP address is not the global IP address, and the sending of the response signal is restricted in a case where the setting information in the memory includes the second information and it is determined that the first IP address is the global IP address.

14. The communication device as in claim 13, wherein
the setting information includes information indicating whether password information is set,
the first information indicates that the password information is being set, and
the second information indicates that the password information is not set.

15. The communication device as in claim 13, wherein
the setting information includes information indicating whether execution of a function of the communication device is allowed,
the first information indicates that the execution of the function is allowed, and
the second information indicates that the execution of the function is prohibited.

16. The communication device as in claim 11, wherein
the sending of the response signal is restricted by not sending the response signal to the external device,
the communication device further comprises a display unit, and
the computer-readable instructions, when executed by the processor, further cause the communication device to:
display a predetermined screen on the display unit in the case where it is determined that the first IP address is the global IP address, the predetermined screen indicating that the first IP address is the global IP address.

17. The communication device as in claim 11, wherein
the request signal is received from the external device by the communication device operating as a server.

18. The communication device as in claim 11, wherein
a second IP address of the communication device is the global IP address.

19. A non-transitory computer-readable recording medium storing computer-readable instructions for a communication device,
wherein the computer-readable instructions, when executed by a processor of the communication device, cause the communication device to:
receive a request signal from an external device via a communication interface of the communication device, the request signal including a first IP address of the external device as a sender address;
determine whether the first IP address in the request signal is a global IP address in a case where the request signal is received from the external device;
determine whether the first IP address in the request signal is identical to an allowed IP address to which a sending of a response signal is allowed, and
send the response signal to the request signal to the external device in a case where it is determined that the first IP address is not the global IP address, wherein the response signal is sent to the external device in a case where it is determined that the first IP address is the global IP address and it is determined that the first network address is identical to the allowed IP address, wherein sending of the request signal is restricted in a case where it is determined that the first IP address is the global IP address and it is determined that the first IP address is not identical to the allowed IP address.

* * * * *